United States Patent Office 2,833,802
Patented May 6, 1958

2,833,802

PROCESS FOR THE PREPARATION OF ORGANOSILICON COMPOUNDS

Robert L. Merker, Pittsburgh, Pa., assignor to Dow Corning Corporation, Midland, Mich., a corporation of Michigan No Drawing. Application February 27, 1956
Serial No. 567,714

16 Claims. (Cl. 260—448.2)

The present invention relates to an improved process for the preparation of organosilicon compounds, particularly hydrocarbonoxyalkylene and substituted hydrocarbonoxyalkylene silicon compounds.

The preparation of silanes and siloxanes of the general type $CH_2=CHCOOCH_2Si\equiv$, $HOOCRCOOCH_2Si\equiv$, and $(OH)_nRCOOCH_2Si\equiv$, where R is a polyvalent hydrocarbon radical, has been illustrated in my copending applications Serial Nos. 431,295-7, all filed May 20, 1954, now U. S. Patent Nos. 2,793,223, 2,770,632 and 2,770,631. The preparation of compounds of the type $X_nC_6H_{5-n}COOCH_2Si\equiv$ and

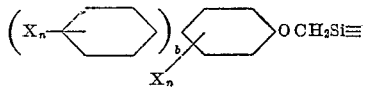

where X is chlorine or bromine and $b$ is 0 or 1, has been illustrated in my copending applications Serial Nos. 470,531-2, filed November 22, 1954, now U. S. Patent Nos. 2,783,263 and 2,783,262. All of these compounds were prepared in the aforesaid copending applications by reacting a metal salt (preferably an alkali metal salt) of the corresponding carboxylic acid or phenol with a silane or siloxane containing the $XCH_2$ group attached to silicon, where X represents a halogen atom.

Although the method described above is in many respects an adequate one to produce the desired compounds, it has certain inherent economical and operational deficiencies. In general, in order to get good yields of products by that method, it is necessary to separately prepare and purify the reactant salt. Also the desired products are obtained in good yields only when a mutual solvent is employed. In this regard, the cheaper organic solvents such as the aromatics are not satisfactory for efficient operation, and solvents such as dimethylformamide are required. Another undesirable feature of the reaction is that the by-product is a metal halide. Reworking this by-product so that it can be utilized again in the reaction is hardly economical, and hence it represents a loss in the over-all economy of the process.

It is an object of the present invention to provide a new and improved process for the preparation of compounds such as those described above, and other organosilicon compounds, by the substitution of the desired organic group for the halogen atom in the $XCH_2Si\equiv$ containing reactant. Further objects are to remove the necessity for the separate preparation and purification of the reactant salt in the type of reaction in question, to remove the necessity of employing expensive or otherwise undesirable solvents, to produce a by-product which is readily recycled in the system, and to extend the range of products which can be obtained by the general method.

In accordance with the present invention, it has been found that the above objectives can be reached by employing certain tertiary amine salts of acidic organic compounds, in place of the metal salts described above, in a reaction which is otherwise quite analogous to the earlier developed reaction. Thus this invention relates to a process comprising reacting a tertiary amine salt of an acidic organic compound, said acidic compound having a dissociation constant $(K_a)$ of greater than $1 \times 10^{-7}$ and the organic radicals attached directly to nitrogen in said amine being alkyl radicals of from 1 to 4 inclusive carbon atoms, with an organosilicon compound containing at least one monohalogenated alkyl radical attached to at least one silicon atom per molecule. To avoid competing reactions, it is preferred that the organosilicon compound should be free of any other substituents reactive toward the said tertiary amine salt. The following equation exemplifies the general course of the reaction:

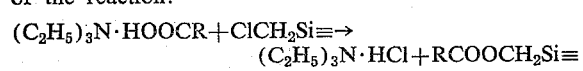

The use of the defined amine salt in the above manner leads to satisfactory yields without the necessity of separating, purifying, and dehydrating the salt. When a solvent is employed in the reaction, as is ordinarily preferable, the simple inexpensive aromatic solvents such as benzene, toluene, and xylene are suitable for their mutual solvent effect and there is no need whatsoever to employ solvents such as dimethylformamide. The ability to make satisfactory use of the former type of solvents permits the extension of the reaction to the highly polymeric organosilicon reactants which were hitherto of no practical use as reactants. The by-product of the reaction of this invention is the corresponding tertiary amine hydrohalide. As is well known the latter can easily be converted back to the original amine, and can thus be recycled in the process.

The acidic organic compounds from which the salts employed herein can be prepared are any hydrogen ion (or proton) donor organic compounds capable of forming the tertiary amine salt. The suitable acidic compounds have a dissociation constant, $K_a$, of greater than $1 \times 10^{-7}$. The most preferred compounds have a $K_a$ value in the range of from $1 \times 10^{-2}$ to $1 \times 10^{-6}$ inclusive. These constants are expressed, as is usual, as determined in dilute aqueous solution at 25° C. See Glasstone, "Textbook of Physical Chemistry," 2d ed., page 974 et. seq. Where more than one hydrogen ion is available from a given compound, as with dibasic acids, it is the constant for the first hydrogen which is referred to herein.

From the above it will be clear that the acidic organic compound is by no means necessarily a carboxylic acid. For example, the halogenated phenols having the required minimum constant will form the defined salt and are suitable here, e. g., pentachloro- and pentabromophenol, with constants of about $10^{-6}$. Benzene sulfonic acid is illustrative of the compounds which may be used at the high end of the dissociation scale. In between these extremes, illustrative $K_a$ values are in the region of $10^{-2}$ for maleic acid, $10^{-3}$ for salicylic and chloro- or bromoacetic acids, and $10^{-5}$ for benzoic, adipic, and acetic acids. On the other hand, compounds with a $K_a$ value of less than $10^{-7}$ (e. g. "carbolic acid," or phenol, with a value in the region of $10^{-10}$) are not suitable.

The most preferred acidic compounds suitable to prepare the amine salts for use in this invention are the mono- and dicarboxylic acids, and the halogenated phenols having the required $K_a$ value. Thus the most preferred salts employed herein are those of an acidic organic compound selected from the group consisting of compounds of the formulas $R^2COOH$, $R^3(COOH)_2$, and $R^4OH$, where $R^2$ and $R^3$ represent monovalent and divalent organic radicals respectively, and are respectively selected from the group consisting of monovalent- and divalent-hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, and $R^4$ represents a haloaryl radical of sufficient halogen content that the phenol in which it occurs has a dissociation constant greater than $1 \times 10^{-7}$.

The defined $R^2$, $R^3$, and $R^4$ radicals are inert in the reaction of this invention, and hence all radicals within the definition are operative. Preferably the $R^2$ and $R^3$ radicals contain no more than 18 carbon atoms. In regard to the $R^2$ radicals, examples of suitable hydrocarbon radicals are alkyl (e. g. methyl, ethyl, isopropyl, t-butyl, and octadecyl), aryl (e. g. phenyl, xenyl, naphthyl), aralkyl (e. g. benzyl), alkaryl (e. g. tolyl), alkenyl (e. g. vinyl, allyl, isopropenyl, octadecenyl), alkynyl (e. g. propynyl) and cycloalkyl (e. g. cyclohexyl). The $R^3$ hydrocarbon radicals are the divalent radicals corresponding to all of these. The hydrocarbon radicals illustrated above can be halogenated with chlorine, bromine, fluorine, or iodine (preferably in an amount not exceeding 5 halogen atoms per molecule), and they can be hydroxy substituted radicals, with a preferred maximum of three hydroxy groups per molecule. As noted, the hydrocarbon radicals also can be substituted with alkoxy radicals (preferably 1–12 carbon atoms), aryloxy radicals (preferably phenoxy), and haloaryloxy radicals (preferably chloro- or bromophenoxy, with a preferred maximum of five halogen atoms per aryloxy radical).

Illustrative examples of suitable monocarboxylic hydrocarbon acids include the saturated aliphatic acids such as formic, acetic, valeric, methylethylacetic, trimethylacetic, caproic, lauric, and stearic acids; and unsaturated aliphatic and aromatic acids such as benzoic, naphthoic, acrylic, methacrylic, crotonic, isocrotonic, vinylacetic, undecylenic, and oleic acids; along with di- and triolefinic and acetylenic acids such as beta-vinylacrylic, sorbic, linoleic, linolenic, elaeostearic, and propynoic acids. Suitable dicarboxylic acids include the straight and branched chain, saturated and unsaturated aliphatics, cycyoaliphatics, and aromatics, e. g. malonic, methylmalonic, succinic, glutaric, adipic, azelaic, sebacic, nonadecanedioic "Japanic"), maleic, dimethylfumaric, phthalic, isophthalic, terephthalic, naphthalic and diphenic acids and cyclohexyl-, stilbene-, tolane-, and dibenzyldicarboxylic acids.

Specific examples of suitable hydroxy substituted organic acids are the aliphatic hydroxy acids such as glycolic, lactic, beta-hydroxybutyric, gamma-hydroxybutyric, 12-hydroxystearic, malic, and tartaric acids; the aromatic hydroxy acids such as salicylic, gallic (3,4,5-trihydroxybenzoic), hydroxyterephthalic, parahydroxycinnamic, 3,4-dihydroxycinnamic, 5-hydroxynaphthoic, and the various cresotic acids; and alicyclic hydroxy acids such as guinic acid.

Suitable alkoxy, aryloxy, and haloaryloxy substituted acids are, e. g., those in which such a group is present in place of the OH group or second carboxylic group in the above discussed acids. Specific examples of suitable acids of this type include 2,4-dichlorophenoxyacetic, p-bromophenoxyacetic, trifluoromethylphenoxyacetic, p-iodophenoxyacetic, phenoxyacetic, biphenyloxyacetic, ethoxyacetic, 12-butoxyoctadecanoic, o-, m-, or p-ethoxybenzoic, o-phenoxybenzoic, and dichlorophenoxybenzoic acids. Preferably the alkoxy or aryloxy radical, when present, contains less than 13 carbon atoms; and any haloaryloxy radical preferably contains less than 6 halogen atoms.

Any of the halogenated hydrocarbon carboxylic acids can also be used herein, although the chlorinated, fluorinated, or brominated derivatives are preferred. Suitable acids of this type are exemplified by trifluoroacetic, 9,10,12,13-tetrabromooctadecanoic, alpha-chloroacrylic, beta-bromocinnamic, o-, m-, or p-fluoro- or iodobenzoic, and pentabromobenzoic acids. As noted previously, the halogenated phenols, cresols, etc., capable of forming the t-amine salts, i. e., those containing sufficient halogen to have a dissociation constant greater than $1 \times 10^{-7}$, are also suitable. Pentabromo- and pentachlorophenol are the best examples of the latter type of compounds.

Products of the greatest present commercial interest are formed from the amine salts of five distinct types of acids:

(1) Unsaturated aliphatic monocarboxylic acids, the most preferred species of which are acrylic and methacrylic acids as represented by the general formula 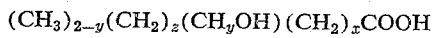 $CH_2{:}C(CH_3)_nH_{1-n}COOH$ where $n$ is 0 or 1.

(2) Unsaturated aliphatic dicarboxylic acids, the preferred specie of which is maleic acid.

(3) Saturated aliphatic dicarboxylic acids, the preferred species being represented by the general formula 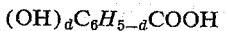 $HOOC(CH_2)_mCOOH$ where $m$ is 4 to 8 inclusive.

(4) Hydroxylated aliphatic monocarboxylic acids, in which the OH group can be terminal or internal, and preferably falling within the general formula $$(CH_3)_{2-y}(CH_2)_z(CH_yOH)(CH_2)_xCOOH$$

where $x$, $z$, and the sum of $x+z$ have a value of from 0 to 16 inclusive, and $y$ has a value of from 1 to 2 inclusive, $z$ being 0 only when $y$ equals 2.

(5) Benzoic acid and hydroxylated benzoic acids, preferably falling within the general formula $$(OH)_dC_6H_{5-d}COOH$$

where $d$ has a value of from 0 to 3 inclusive.

The acidic compounds discussed above can be employed herein either singly or in mixture. In any given system it is obvious that fractional values for $d$, $m$, $n$, $x$, $y$, or $z$ can be obtained by using more than one acid of a given type.

The tertiary amine with which the above discussed acidic compounds can be reacted to form the salts employed herein are t-alkylamines in which the alkyl radicals contain from 1 to 4 inclusive carbon atoms. Examples of such amines are trimethylamine, triethylamine, diethylmethylamine, tributylamine, and triisobutylamine. A mixture of amines can be employed if desired, and the alkyl radicals need not be the same on any given nitrogen atom. Because of its boiling point, availability, cost, reactivity, and general handling properties, triethylamine is the most preferred compound for forming the salts employed herein.

Salts of the type formed from the reaction of the above described amines and acidic compounds are well known in the art, and any of the known techniques for their preparation can be employed herein. Often the salt can be formed by merely mixing the reactants at ordinary temperatures. Of course any elevated temperature short of the decomposition temperature of the reactants or product can be employed if desired. Atmospheric pressure is ordinarily used, except when the low boiling point of an amine such as trimethylamine obviously suggests sunperatmospheric pressure for efficient results. The reaction can be conducted in the presence or absence of inert organic solvents, but ordinarily the use of an aromatic solvent such as benzene, toluene, or xylene is preferred. Other hydrocarbons, such as cyclohexane, and ethers such as dioxane can also be used. Preferably the reaction is conducted with all of the reactants in a compatible liquid phase, and the use of an appropriate temperature and/or a solvent helps to achieve such a phase.

If desired the salt can be isolated prior to its use in this invention, but this step is ordinarily not necessary and thus is usually avoided. The desired reaction proceeds at any ratio whatsoever of the reactants, but for the sake of volumetric efficiency it is preferred that one reactant be within 50 to 150 percent of the stoichiometric amount of the other. When the salt is not isolated, as is usually the case, an excess of either the amine or the acid in the reaction mass does not prohibit the reaction of the salt with the defined organosilicon compounds. In fact, the best results are obtained when there is a slight excess (e. g., up to about a 25 molar percent excess) of the acidic compound over the amine in the mixture to which the organosilicon compound is added.

The organosilicon reactant in the present process is one which contains a monohalogenated alkyl radical attached directly by C—Si linkage to at least one silicon atom per molecule of the reactant. Preferably this alkyl radical contains from 1 to 4 inclusive carbon atoms. Although two or more such radicals can be attached to a single silicon atom, it is preferred that there be not more than one attached to a given silicon. For the sake of economy and the efficiency of the reaction, it is preferred that the halogen be chlorine or bromine.

The halogen can be present at any position on the alkyl radical, but a terminal position is preferred. In regard to the efficiency of the reaction and stability of the reaction products, the use of a chloromethyl substituted silicon compound is the most preferred. To avoid competing reactions it is also preferred that the organosilicon compound be free of any other substituents reactive toward other constituents of the reaction mass, i. e., toward the amine, the acid, or the salt. Thus the valencies of the silicon atom not satisfied by the required haloalkyl radical are preferably satisfied by hydrocarbon radicals, hydrogen atoms, or oxygen atoms. This freedom from other reactive substituents is desirable to avoid unduly complex reaction products and poor yields of the desired product, but is not absolutely essential because the desired reaction can take place to some extent in spite of competing reactions.

The organosilicon reactant can be either monomeric or polymeric. The preferred compounds are those containing molecular units of the general formula $$Z_q SiR_r (OR')_s O_{\frac{4-q-r-s}{2}}$$

where R and R' are monovalent hydrocarbon radicals, Z is a monohalogenated alkyl radical containing from 1 to 4 inclusive carbon atoms and in which the halogen is chlorine or bromine, $r$ and $s$ have values of from 0 to 3 inclusive with the sum of $r+s$ having a value of from 0 to 3 inclusive, and $q$ has a value of from 1 to 2 inclusive. It is to be understood that the term "molecular unit" as used above means that the unit can be either a unit within a polymer of other similar or dissimilar polymeric units, or it can be the only unit present in a given molecule and hence can represent a monomeric compound per se.

R and R' in the above formula take no part in the process of this invention, and hence each can be any monovalent hydrocarbon radical. When more than one R or more than one —OR' radical is attached to a single silicon atom, each R or R' can be the same as or different from its fellows. Examples of suitable R and R' radicals are alkyl radicals such as methyl, ethyl, and octadecyl; aryl radicals such as phenyl and xenyl; aralkyl radicals such as tolyl; alkaryl radicals such as benzyl; alkenyl and alkynyl radicals such as vinyl, allyl, and pyropynyl; and cycloaliphatic radicals such as cyclohexyl and cyclohexenyl. Preferably the R and R' radicals, when present, contain from 1 to 18 carbon atoms. The most preferred radicals are methyl, ethyl, and phenyl.

When the sum of $q+r+s$ in the above formula is less than 4, the formula represents a unit in a polymeric organosiloxane. The polymer can be one in which all of the units are alike, or in which different units falling within the expressed general formula are present, or in which other polymeric units are present. Any such other units are preferably of the general formula $$R_g^5 SiO_{\frac{4-g}{2}}$$

where $R^5$ is any monovalent hydrocarbon radical, and $g$ has a value of from 0 to 3 inclusive. The $R^5$ radicals in such a unit can be the same as or different from the other $R^5$ radicals present in the unit or the R radicals in the other units of the copolymer. Examples of suitable $R^5$ radicals are the same as those listed above for R and R'. Thus the polymeric reactant can contain the defined haloalkylsiloaxane units copolymerized with $SiO_2$, $R^5SiO_{1.5}$, $R_2^5SiO$, or $R_3^5SiO_{.5}$ units singly or in any combination. The units can be present in any ratio, the only requirement being that there is at least one haloalkylsiloxane unit per molecule.

Examples of suitable monomeric organosilicon reactants include $ClCH_2Si(CH_3)_3$, $BrCH_2Si(OC_2H_5)_3$, $$ClCH_2CH_2Si(C_{18}H_{37})(OCH_3)_2,$$
$$ClCH_2(CH_2)_3Si(CH_3)_2(OC_6H_5),$$

and $ClCH_2SiC_6H_5(OC_2H_5)_2$. Suitable polymeric reactants include, e. g., dimers such as $$ClCH_2(CH_3)_2SiOSi(CH_3)_2CH_2Cl \text{ and}$$

$ClCH_2(CH_3)_2SiOSi(CH_3)_2C_6H_5$, and polymers or copolymers containing $ClCH_2SiO_{1.5}$, $(ClCH_2)_2SiO$, $$BrCH_2Si(CH_3)_2O_{.5}, \; BrCH_2(CH_2)_3SiC_6H_5O,$$

$ClCH_2Si(CH:CH_2)(C_6H_{11})O_{.5}$, or $ClCH_2Si(OC_2H_5)O$ units alone, in mixture, or in combination with $SiO_2$, $$CH_3SiO_{1.5}, \; C_6H_5SiO_{1.5}, \; CH_3C_6H_5SiO, \; (CH_3)_2SiO,$$
$$C_2H_5(CH_2:CH)C_6H_5SiO_{.5}, \; (CH_3)_3SiO_{.5}, \text{ or}$$

$CH_3(C_6H_5O)SiO$ units. Any polymeric or copolymeric reactant employed should not be condensed beyond the stage at which it is still soluble in some organic solvent. Preferably at least 5 molar percent of the Si atoms present in any copolymer used have the defined haloalkyl radical attached thereto.

The haloalkysilanes and siloxanes which are employed herein can be prepared, for example, by halogenating the corresponding alkylsilane. If the latter is a halosilane, it can then be hydrolyzed to produce the siloxane, or alkoxylated, or reacted with a Grignard reagent to introduce other organic substituents. The haloalkylalkoxysilanes can be partially hydrolyzed, if desired, to produce siloxanes containing some (OR') groups. It is also possible to halogenate an alkysiloxane directly. Copolymers can be prepared by cohydrolysis of the corresponding hydrolyzable silanes, or by copolymerization of the appropriate organosiloxane polymers, e. g. with an acid catalyst. These various methods are well known in the art.

The most preferred organosilicon reactants are those containing a $ClCH_2$— group attached to silicon. Thus the preferred monomers have the general formula $ClCH_2SiR_r(OR')_{3-r}$, where R, R' and $r$ are as above defined. The preferred polymeric reactants are those containing units of the general formula $$ClCH_2SiR_tO_{\frac{3-t}{2}}$$

where $t$ has a value from 0 to 2 inclusive. The preferred dimeric reactants are those of the general formula $ClCH_2(CH_3)_2SiOSi(CH_3)_2CH_2H_hCl_{1-h}$ where $h$ is an integer of from 0 to 1 inclusive. Since the organosilicon reactants can be used in the form of a mixture of any of the defined compounds, the subscripts $q$, $r$, $s$, $g$, and $t$ can each have fractional values in the reaction mixture.

The organosilicon reactant can be used in any amount in regard to the amine salt or the acid and amine from which the salt is prepared. Again it is only a consideration of volumetric efficiency which makes it preferable that the quantity of the salt present (or which would be formed) should be within the range of 50 to 150 percent of the equivalent amount of haloalkyl substituents in the organosilicon reactant. The best yields, as calculated from the amount of organosilicon reactant employed, are obtained by using a slight excess (e. g. 1 to 15 percent excess) of the amine salt.

It is preferred that the reaction between the amine salt and the organosilicon reactant take place in the liquid phase. Although some reaction takes place with certain reactants at ambient temperatures, it is preferred that an elevated temperature be employed to expedite the course of the reaction. In general, temperatures of from 50° to 200° C. are preferred, with best results being obtained in the range of 100° to 175° C. The presence of an organic solvent during the reaction is not essential but is desirable, and of course this is preferably a mutual solvent for the salt and the organosilicon compound. The same solvent as that which was preferably present during the salt formation is satisfactory in this step, and it is generally used in an amount of from 25 to 400 percent by weight based on the weight of the total reactants, although any larger amount is satisfactory. Ordinarily any inert hydrocarbon, halohydrocarbon, or ethereal hydrocarbon will serve the purpose, and the choice is mainly dictated by boiling point, availability, general handling properties, and economies.

It is to be understood that the amine salt is not necessarily prepared as a separate step, with the organosilicon reactant being added to the salt per se. In fact a preferred mode of operating consists of mixing the amine, the acidic compound, the organosilicon reactant, and a solvent, and then heating the entire mixture. In such a case the salt itself may be merely a theoretical intermediate, and its existance is probably exceedingly evanescent.

When the acidic reactant is one which is highly susceptible to polymerization, e. g. acrylic or methacrylic acid, the reaction of this invention can best be carried out in the presence of a polymerization inhibitor for that reactant. The reactivity of the acid is usually found in the reaction product as well, so that the presence of the inhibitor is often desirable during later operations involving the reaction product. The choice of a suitable inhibitor often depends upon the equipment and temperatures used in any given step in a given reaction. For example, one inhibitor may be satisfactory during a reaction but not entirely satisfactory during later processing, such as distillation, because of its boiling point. Thus it is often desirable to use more than one inhibitor during the process.

A combination of inhibitors, such as a relatively volatile one and a relatively non-volatile one, is thus often desirable. Hydroquinone is a good example of the former type, and the latter type is exemplified by N,N'-diphenylphenylene diamine. When both types of inhibitors are present, unwanted polymerization can be more effectively controlled, e. g., in both the distillation pot and column, or reaction flask and reflux condenser.

The amount of inhibitor required for best results will obviously vary with the particular reactants and reaction or processing conditions. Ordinarily the total amount of inhibitor present should lie in the range of from 0.1 to 30 percent by weight, based on the weight of the acidic organic compound which was introduced initially.

The uses to which the products of this invention may be subjected are as varied as the products themselves. Products containing, e. g., unsaturated acyloxymethyl radicals attached to silicon can be hydrolyzed, or cohydrolyzed or copolymerized with other organosilicon compounds to produce resinous and elastomeric organosiloxanes capable of all the well-known uses of such products as laminating and molding resins, electrical insulation, high temperature gasketing, etc. Hydroxyacyloxymethyl substituted products find use as sun screen agents, paints, waxes, and polishes. They are soluble in silicone fluids, and hence permit the addition of antioxidizing, stabilizing, or EP additive substituents which could not heretofore be incorporated in silicone fluids because the corresponding organic compounds were insoluble therein. Carboxyester substituted products have found use as lubricants, rust inhibitors, and emulsifiers. The haloacyloxymethyl substituted materials are useful as lubricants and lubricant additives, as are the halophenoxymethyl substituted materials. The products which contain functional groups, e. g. unsaturated ester groups, hydroxyacid ester groups, and carboxyester groups, can be reacted with other functional organosilicon compounds or with functional organic compounds through typical organic polymerization reactions.

The following examples are illustrative only. All parts given are parts by weight unless otherwise specified. For simplicity the symbols Me, Et, and Ph are used for methyl, ethyl, and phenyl radicals respectively.

*Example 1.*—A mixture of 36 parts (0.6 mole) acetic acid, 55.5 parts (0.55 mole) triethylamine, 58 parts (0.25 mole) bis-chloromethyltetramethyldisiloxane,

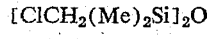

and 60 parts of xylene was prepared. This homogeneous mixture was heated at reflux temperature for 18 hours and the resulting solids were filtered from the reaction mass. The filtrate was distilled and provided 93 percent of the theoretical yield of tetramethyldisiloxane-bis-(1,3-methylacetate). The same product is obtained, although in a lower yield, when trimethylamine or tributylamine is employed in place of the triethylamine used above.

*Example 2.*—A solution of 51 parts (0.6 mole) glacial methacrylic acid, 55.5 parts (0.55 mole) triethylamine and 3 parts hydroquinone as a polymerization inhibitor was prepared in 110 parts xylene. To this solution was added 57.8 parts (0.25 mole) bis-chloromethyltetramethyldisiloxane and the mixture was heated at reflux for 8 hours. 68.5 parts of $Et_3N \cdot HCl$ was removed from the reaction mass by filtration. (Theory=69 parts.) The filtrate was heated to remove the xylene solvent and the residue was then distilled. 37 parts of tetramethyldisiloxane-bis-(1,3-methylmethacrylate) was obtained as a distillate, representing 45 percent of the theoretical yield. This product had a boiling point of 127° C./3 mm. Hg. $n_D^{25}$ 1.4472, $d_4^{25}$ 0.996. The remainder of the product was present as a polymeric material in the distillation residue.

*Example 3.*—In the manner of Example 2, 2,4-dichlorophenoxyacetic acid, triethylamine, and bis-chloromethyltetramethyldisiloxane were reacted in xylene to give a 93 percent yield of tetramethyldisiloxane-bis-(1,3-methyl 2,4-dichlorophenoxyacetate), $n_D^{25}$ 1.5222.

*Example 4.*—A mixture of 97 parts bis-chloromethyltetramethyldisiloxane, 43 parts glacial formic acid, 90 parts triethylamine, and 150 parts of xylene was heated at reflux for 12 hours. The precipitated triethylamine hydrochloride was filtered off and the filtrate distilled to give an 84 percent yield of tetramethyldisiloxane-bis-(1,3-methyl formate having a boiling point of 143° C./40 mm. Hg, $n_D^{25}$ 1.4228.

*Example 5.*—A solution of 112 parts (1.11 moles) of triethylamine in xylene was added to 107 parts (1.24 moles) methacrylic acid. 10 parts of hydroquinone and 115.6 parts (0.5 mole) of bis-chloromethyltetramethyldisiloxane were added slowly to the former solution while it was heated at reflux temperature. The solution was maintained at reflux for 12 hours, then cooled and filtered. The filtrate was washed with water and sodium bicarbonate, dried over sodium sulfate and heated to remove the xylene to give a residue of tetramethyldisiloxane-bis-(1,3-methylmethacrylate), $n_D^{25}$ 1.448. This residue was mixed with hexamethyldisiloxane in a molar ratio of 1:6.5 along with 20 parts each of sulfuric acid and trifluoroacetic acid. After standing at room temperature for 20 hours, the reaction mixture was washed, dried, and distilled using both hydroquinone and N,N'-diphenylphenylene diamine as polymerization inhibitors, to give pentamethyldisiloxanemethylmethacrylate boiling at 43° C./2 mm. Hg, $n_D^{25}$ 1.4208.

*Example 6.*—A solution of 101 parts (1 mole) triethylamine, 87 parts (1.2 moles) acrylic acid, 10 parts hydroquinone, and 115.6 parts (0.5 mole) bis-chloromethyltetramethyldisiloxane in 350 parts of xylene was heated at reflux for 8 hours. The solids were removed by filtration and the filtrate was washed with water and sodium bicarbonate, dried over anhydrous sodium sulfate, and the xylene removed by distillation to give as a residue the product tetramethyldisiloxane-bis - (1,3-methylacrylate), $n_D^{25}$ 1.4418, $d_4^{25}$ 1.008, specific refraction 0.2624 (calculated value=0.2615). This product was mixed with 500 parts of hexamethyldisiloxane, 20 parts sulfuric acid and 20 parts trifluoroacetic acid. The mixture was allowed to stand for four days at room temperature, and was then washed, neutralized, and dried. Distillation was carried out at reduced pressure using both hydroquinone and N,N'-diphenylphenylene diamine as polymerization inhibitors to yield pentamethyldisiloxanemethylacrylate, boiling at 113° C./50 mm. Hg. $n_D^{25}$ 1.4131, $d_4^{25}$ 0.906, specific refraction 0.2753 (calculated value=0.2756).

*Example 7.*—A solution of 56 parts (0.55 mole) triethylamine, 43.5 parts (0.6 mole) acrylic acid, 10 parts hydroquinone and 91.3 parts (0.5 mole) (chloromethyl)-diethoxymethylsilane in 150 parts of xylene was heated at reflux for 20 hours. The reaction mixture was diluted with petroleum ether and the solids therein removed by filtration. The filtrate was stripped of solvent, distilled at a pressure of 1 mm. Hg, and then redistilled at 25 mm. Hg using both hydroquinone and N,N'-diphenylphenylene diamine as polymerization inhibitors. The product diethoxymethylsilylmethylacrylate was obtained from the second distillation in an over-all yield of 72 percent and had a boiling point of 111° C./2.5 mm. Hg, $n_D^{25}$ 1.4214, $d_4^{25}$ 0.986, specific refraction 0.2573 (calculated 0.2576).

*Example 8.*—A mixture of 38.5 parts (0.25 mole) adipic acid, 50.5 parts (0.5 mole) triethylamine and 57.8 parts (0.25 mole) bis-chloromethyltetramethyldisiloxane in xylene was heated at reflux temperature for 48 hours. The reaction mass was cooled and the precipitated solids removed by filtration. 69 parts of Et$_3$N·HCl were obtained in this manner as compared to the theoretical amount of 68.7 parts. The filtrate was treated with activated charcoal and a silica filter-aid, filtered, and the xylene removed by distillation. The viscosity of the residue was about 500 cs. at 25° C. The product was analyzed and was found to have a neutral equivalent of 1890 and a silicon content of 17.75 percent. This analysis corresponds approximately to a compound having the following average structure:

HOOC(CH$_2$)$_4$COOCH$_2$SiMe$_2$[OSiMe$_2$CH$_2$OOCH(CH$_2$)$_4$ COOCH$_2$SiMe$_2$]$_{11}$OSiMe$_2$CH$_2$OOC(CH$_2$)$_4$COOH

The latter would have a neutral equivalent of 1900 and a silicon content of 17.73 percent. Analysis showed no chlorine present in this residue.

*Example 9.*—In the manner of Example 8, a mixture of 29 parts (0.25 mole) maleic acid, 57.7 parts (0.25 mole) bis-chloromethyltetramethyldisiloxane and 56 parts (0.55 mole) triethylamine in xylene was heated at reflux and yielded 98 percent of the theoretical amount of Et$_3$N·HCl and a viscous liquid containing 19.99 percent Si and having a neutral equivalent of 7970.

*Example 10.*—When equimolar quantities of glacial acetic acid, triethylamine, and BrCH$_2$SiMe$_2$Ph, with benzene as a solvent, are heated to 125° C. in an autoclave, the product dimethylphenylsilylmethylacetate is formed. When the above organosilicon reactant is replaced with ClCH$_2$SiMe$_2$(OPh) in an otherwise comparable reaction, the product obtained is dimethylphenoxysilylmethylacetate.

*Example 11.*—When the general procedure of the first step in Example 6 is followed, reacting acrylic acid, triethylamine, hydroquinone, and xylene, but using chloromethylpentamethyldisiloxane as the organosilicon reactant, the product obtained is pentamethyldisiloxanemethylacrylate. Thus a product is obtained in one step identical to the product obtained in two steps in Example 6. In this case, however, rearrangement takes place to some extent, and hexamethyldisiloxane and tetramethyldisiloxane-bis-(1,3-methylacrylate) are also obtained as by-products.

*Example 12.*—The compound ClCH$_2$MeSiCl$_2$ was cohydrolyzed with the appropriate organochlorosilanes and SiCl$_4$ to produce a copolymer containing the following polymeric units in the indicated molar percentages: 30ClCH$_2$MeSiO, 20Me$_3$SiO$_{.5}$, 10PhEtSiO, 5 SiO$_2$, 10 cyclohexylmethylsiloxane, 10 benzylmethylsiloxane, and 15 methylvinylsiloxane. When a solution of this viscous fluid copolymer in toluene is added to an equivalent weight of a solution of triethylammonium acetate in xylene, and the reaction mass heated at reflux, triethylammonium chloride is precipitated out of the system and a corresponding copolymer containing CH$_3$CH$_2$COOCH$_2$SiMeO units is produced

*Example 13.*—The reaction of equimolar quantities of ClCH$_2$CH$_2$SiMe$_3$, triethylamine, and lactic acid in benzene solution by the method of Example 10 produces the compound MeCHOHCOOCH$_2$CH$_2$SiMe$_3$.

*Example 14.*—The reaction of salicyclic acid, triethylamine, and (ClCH$_2$Me$_2$Si)$_2$O in the manner of Example 1 produces the crystalline produce (HOC$_6$H$_4$COOCH$_2$Me$_2$Si)$_2$O having a melting point of 38° C. When the salicylic acid is replaced in the same reaction with glycolic acid, the product is a liquid of the formula (HOCH$_2$COOCH$_2$MeSi)$_2$O $n_D^{25}$ 1.4408, $d_4^{25}$ 1.103. The use of 12-hydrostearic acid in the same reaction yields the product

[CH$_3$(CH$_2$)$_5$CHOH(CH$_2$)$_{10}$COOCH$_2$Me$_2$Si]$_2$O

*Example 15.* — The reaction of 4,6-dichlorobenzoic acid, triethylamine, and (ClCH$_2$Me$_2$Si)$_2$O in the manner of Example 1 produces a liquid of the formula (Cl$_2$C$_6$H$_3$COOCH$_2$Me$_2$Si)$_2$O $n_D^{25}$ 1.5357, $d_4^{25}$ 1.275. When the above acid is replaced by terephthalic acid in this reaction, the product has the formula (HOOCC$_6$H$_4$COOCH$_2$Me$_2$Si)$_2$O

*Example 16.*—The reaction of pentachlorophenol, triethylamine and (ClCH$_2$Me$_2$Si)$_2$O in the manner of Example 1 produces the crystalline compound (Cl$_5$C$_6$OCH$_2$Me$_2$Si)$_2$O having a melting point of about 117° C.

*Example 17.*—The reaction of adipic acid, triethylamine, and chloromethylheptamethylcyclotetrasiloxane in the manner of Example 1 yields a liquid product, $n_D^{25}$ 1.4464, $d_4^{25}$ 1.1, and having the formula:

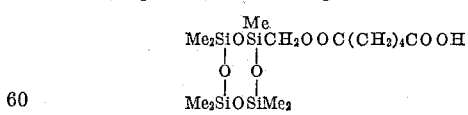

*Example 18.*—When the acetic acid in Example 1 is replaced with equivalent quantities of phenoxyacetic or ethoxyacetic acid in an otherwise identical reaction, the products are, respectively: [PhOCH$_2$COOCH$_2$(Me)$_2$Si]$_2$O and [EtOCH$_2$COOCH$_2$(Me)$_2$Si]$_2$O.

That which is claimed is:

1. A process which comprises reacting a tertiary amine salt of an acidic organic compound, said acidic compound having a dissociation constant of greater than $1 \times 10^{-7}$ and the organic radicals attached directly to nitrogen in said amine salt being alkyl radicals of from 1 to 4 inclusive carbon atoms, with an organosilicon compound containing at least one monohalogenated alkyl radical attached to at least one silicon atom per molecule, said organosilicon compound being free of any other substituents reactive toward other constituents of the reaction mass.

2. A process which comprises reacting a tertiary amine salt of an acidic organic compound, said acidic compound having a dissociation constant of greater than $1 \times 10^{-7}$ and the organic radicals attached directly to nitrogen in said amine being alkyl radicals of from 1 to 4 inclusive carbon atoms, with an organosilicon compound containing molecular units of the general formula $$Z_qSiR_r(OR')_sO_{\frac{4-q-r-s}{2}}$$

where R and R' are monovalent hydrocarbon radicals, Z is a monohalogenated alkyl radical containing from 1 to 4 inclusive carbon atoms and in which the halogen atom is selected from the group consisting of chlorine and bromine atoms, $r$ and $s$ have values of from 0 to 3 inclusive with the sum of $r+s$ having a value of from 0 to 3 inclusive, and $q$ has a value of from 1 to 2 inclusive, by contacting the defined reactants under conditions such that at least one of the reactants is in liquid phase.

3. A process in accordance with claim 2, wherein the organosilicon compound is a monomeric silane having the general formula $ClCH_2SiR_r(OR')_{3-r}$, wherein R, R' and $r$ are as defined in claim 2.

4. A process in accordance with claim 2, wherein the organosilicon compound is an organopolysiloxane containing units of the formula $$ClCH_2SiR_tO_{\frac{3-t}{2}}$$

wherein R represents a monovalent hydrocarbon radical and $t$ has a value of from 0 to 2 inclusive, any remaining units in the organopolysiloxane having the general formula $$R^5{}_xSiO_{\frac{4-g}{2}}$$

wherein $R^5$ is a monovalent hydrocarbon radical and $g$ has a value of from 0 to 3 inclusive.

5. A process which comprises reacting a tertiary amine salt of an acidic organic compound, said acidic compound having a dissociation constant of greater than $1 \times 10^{-7}$ and the organic radicals attached directly to nitrogen in said amine being alkyl radicals of from 1 to 4 inclusive carbon atoms, with an organopolysiloxane containing units of the formula $$ClCH_2(CH_3)_tSiO_{\frac{3-t}{2}}$$

wherein $t$ has a value of from 0 to 2, inclusive, by contacting the reactants in liquid phase at a temperature of from 50° C. to 200° C.

6. A process which comprises reacting a tertiary amine salt of an acidic organic compound, said acidic compound having a dissociation constant of greater than $1 \times 10^{-7}$ and the organic radicals attached directly to nitrogen in said amine being alkyl radicals of from 1 to 4 inclusive carbon atoms, with an organosiloxane of the formula $ClCH_2(CH_3)_2SiOSi-(CH_3)_2CH_2H_hCl_{1-h}$, where $h$ is an integer of from 0 to 1, inclusive, by contacting the reactants in liquid phase at a temperature of from 50° C. to 200° C.

7. A process which comprises reacting a tertiary amine salt of an acidic organic compound selected from the group consisting of compounds of the formulas $R^2COOH$, $R^3(COOH)_2$, and $R^4OH$, the organic radicals attached directly to nitrogen in said tertiary amine salt being alkyl radicals of from 1 to 4 inclusive carbon atoms, $R^2$ and $R^3$ representing monovalent and divalent organic radicals respectively, and being respectively selected from the group consisting of monovalent- and divalent hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, and $R^4$ representing a haloaryl radical of sufficient halogen content that the phenol in which it occurs has a dissociation constant greater than $1 \times 10^{-7}$, with an organosilicon compound containing molecular units of the general formula $$Z_qSiR_r(OR')_sO_{\frac{4-q-r-s}{2}}$$

where R and R' are monovalent hydrocarbon radicals, Z is a monohalogenated alkyl radical containing from 1 to 4 inclusive carbon atoms and in which the halogen atom is selected from the group consisting of chlorine and bromine atoms, $r$ and $s$ have values of from 0 to 3 inclusive with the sum of $r+s$ having a value of from 0 to 3 inclusive, and $q$ has a value of from 1 to 2 inclusive, by contacting the defined reactants under conditions such that at least one of the reactants is in liquid phase.

8. A process in accordance with claim 7, wherein the organosilicon compound is a monomeric silane of the formula $ClCH_2SiR_r(OR')_{3-r}$, wherein R, R' and $r$ are as defined in claim 7.

9. A process in accordance with claim 7, wherein the organosilicon compound is an organopolysiloxane containing units of the general formula $$ClCH_2SiR_tO_{\frac{3-t}{2}}$$

wherein R represents a monovalent hydrocarbon radical and $t$ has a value of from 0 to 2 inclusive, any remaining units in the organopolysiloxane having the general formula $$R^5{}_xSiO_{\frac{4-g}{2}}$$

wherein $R^5$ is a monovalent hydrocarbon radical and $g$ has a value of from 0 to 3 inclusive.

10. A process which comprises reacting a tertiary amine salt of an organic acid having the general formula $$\begin{array}{c}(CH_3)_n\\|\\CH_2\!\!=\!\!CCOOH\\|\\H_{1-n}\end{array}$$

where $n$ is an integer of from 0 to 1 inclusive, the organic radicals attached directly to nitrogen in said amine being alkyl radicals of from 1 to 4 inclusive carbon atoms, with an organopolysiloxane containing units of the general formula $$ClCH_2SiR_tO_{\frac{3-t}{2}}$$

wherein R represents a monovalent hydrocarbon radical and $t$ has a value of from 0 to 2 inclusive, any remaining units in the organopolysiloxane having the general formula $$R^5{}_xSiO_{\frac{4-g}{2}}$$

wherein $R^5$ is a monovalent hydrocarbon radical and $g$ has a value of from 0 to 3 inclusive.

11. A process in accordance with claim 10 wherein the reaction and any later separation of the reaction products are carried out in the presence of a polymerization inhibitor selected from the group consisting of hydroquinone and N,N'-diphenylphenylene diamine.

12. A process which comprises reacting a tertiary amine salt of maleic acid, the organic radicals attached directly to nitrogen in said amine being alkyl radicals of from 1 to 4 inclusive carbon atoms, with an organopolysiloxane containing units of the general formula $$ClCH_2SiR_tO_{\frac{3-t}{2}}$$

wherein R represents a monovalent hydrocarbon radical and $t$ has a value of from 0 to 2 inclusive, any remaining units in the organopolysiloxane having the general formula $$R^5{}_g SiO_{\frac{4-g}{2}}$$

wherein $R^5$ is a monovalent hydrocarbon radical and $g$ has a value of from 0 to 3 inclusive.

13. A process which comprises reacting a tertiary amine salt of a dicarboxylic acid of the general formula $HOOC(CH_2)_m COOH$, where $m$ has a value of from 4 to 8 inclusive, the organic radicals attached directly to nitrogen in said amine salt being alkyl radicals of from 1 to 4 carbon atoms inclusive, with an organopolysiloxane containing units of the formula $$ClCH_2 SiR_t O_{\frac{3-t}{2}}$$

wherein R represents a monovalent hydrocarbon radical and $t$ has a value of from 0 to 2 inclusive, any remaining units in the organopolysiloxane having the general formula $$R^5{}_g SiO_{\frac{4-g}{2}}$$

wherein $R^5$ is a monovalent hydrocarbon radical and $g$ has a value of from 0 to 3 inclusive.

14. A process which comprises reacting a tertiary amine salt of an hydroxy substituted monocarboxylic acid having the general formula $$(CH_3)_{2-y}(CH_2)_z(CH_yOH)(CH_2)_x COOH$$

where $x$ and $z$ each have a value of from 0 to 16 inclusive, the sum of $x+z$ has a value of from 0 to 16 inclusive, and $y$ has a value of from 1 to 2 inclusive, $z$ being 0 only when $y=2$, the organic radicals attached directly to nitrogen in said amine salt being alkyl radicals of from 1 to 4 inclusive carbon atoms, with an organopolysiloxane containing units of the general formula $$ClCH_2 SiR_t O_{\frac{3-t}{2}}$$

wherein R represents a monovalent hydrocarbon radical and $t$ has a value of from 0 to 2 inclusive, any remaining units in the organopolysiloxane having the general formula $$R^5{}_g SiO_{\frac{4-g}{2}}$$

wherein $R^5$ is a monovalent hydrocarbon radical and $g$ has a value of from 0 to 3 inclusive.

15. A process which comprises reacting a tertiary amine salt of an aromatic acid of the general formula $(OH)_d C_6 H_{5-d} COOH$, where $d$ has a value of from 0 to 3 inclusive, the organic radicals attached directly to nitrogen in said amine salt being alkyl radicals of from 1 to 4 inclusive carbon atoms, with an organopolysiloxane containing units of the formula $$ClCH_2 SiR_t O_{\frac{3-t}{2}}$$

wherein R represents a monovalent hydrocarbon radical and $t$ has a value of from 0 to 2 inclusive, any remaining units in the organopolysiloxane having the general formula $$R^5{}_g SiO_{\frac{4-g}{2}}$$

wherein R is a monovalent hydrocarbon radical and $g$ has a value of from 0 to 3 inclusive.

16. A process which comprises contacting (1) a tertiary alkylamine in which the alkyl radicals contain from 1 to 4 inclusive carbon atoms, (2) an acidic organic compound selected from the group consisting of compounds of the formulas $R^2 COOH$, $R^3(COOH)_2$, and $R^4 OH$, where $R^2$ and $R^3$ represent monovalent and divalent organic radicals respectively, and are respectively selected from the group consisting of monovalent- and divalent hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, and $R^4$ represents a haloaryl radical of sufficient halogen content that the phenol in which it occurs has a dissociation constant greater than $1 \times 10^{-7}$, and (3) an organosilicon compound containing units of the general formula $$Z_q SiR_r(OR')_s O_{\frac{4-q-r-s}{2}}$$

where R and R' are monovalent hydrocarbon radicals, Z is a monohalogenated alkyl radical containing from 1 to 4 inclusive carbon atoms and in which the halogen atom is selected from the group consisting of chlorine and bromine atoms, $r$ and $s$ have values of from 0 to 3 inclusive, with the sum of $r+s$ having a value of from 0 to 3 inclusive, and $q$ has a value of from 1 to 2 inclusive, in an inert organic solvent which is a mutual solvent for (1), (2) and (3), and heating the mixture at a temperature of from 100° to 200° C.

No references cited.

UNITED STATES PATENT OFFICE
Certificate of Correction

Patent No. 2,833,802　　　　　　　　　　　　　　　　　　May 6, 1958

Robert L. Merker

It is hereby certified that error appears in the printed specification of the above numbered patent requiring correction and that the said Letters Patent should read as corrected below.

Column 1, line 24, after "2,770,631" and before the period insert —, respectively—; line 34, after "2,783,262" and before the period insert —, respectively—; column 5, lines 73 and 74, the formula should appear as shown below instead of as in the patent—

column 7, line 20, for "economies" read —economics—; column 10, line 32, the formula should appear as shown below instead of as in the patent—

column 14, lines 8 and 9, the formula should appear as shown below instead of as in the patent—

Signed and sealed this 22nd day of July 1958.

[SEAL]

Attest:
KARL H. AXLINE,
*Attesting Officer.*

ROBERT C. WATSON,
*Commissioner of Patents.*